US009606759B2

(12) United States Patent
Hamayama

(10) Patent No.: US 9,606,759 B2
(45) Date of Patent: Mar. 28, 2017

(54) PRINTER

(71) Applicant: RISO KAGAKU CORPORATION, Tokyo (JP)

(72) Inventor: Shingo Hamayama, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 15/090,928

(22) Filed: Apr. 5, 2016

(65) Prior Publication Data
US 2016/0328188 A1 Nov. 10, 2016

(30) Foreign Application Priority Data

May 8, 2015 (JP) ................. 2015-095371

(51) Int. Cl.
| | | |
|---|---|---|
| G06F 15/00 | (2006.01) | |
| G06F 3/12 | (2006.01) | |
| G06K 15/00 | (2006.01) | |
| G06K 1/00 | (2006.01) | |
| H04N 1/44 | (2006.01) | |
| H04N 1/00 | (2006.01) | |

(52) U.S. Cl.
CPC ............ *G06F 3/1238* (2013.01); *G06F 3/128* (2013.01); *G06F 3/1222* (2013.01); *G06F 3/1284* (2013.01); *H04N 1/00005* (2013.01); *H04N 1/0009* (2013.01); *H04N 1/00015* (2013.01); *H04N 1/00034* (2013.01); *H04N 1/4413* (2013.01); *H04N 2201/0094* (2013.01)

(58) Field of Classification Search
CPC ...... G06F 3/1238; G06F 3/1222; G06F 3/128; G06F 3/1284; H04N 1/00005; H04N 1/00015; H04N 1/00034; H04N 1/0009; H04N 1/4413; H04N 2201/0094

USPC ...................... 358/1.1, 1.15, 1.14
See application file for complete search history.

(56) References Cited

U.S. PATENT DOCUMENTS

2008/0123135 A1* 5/2008 Inoue ................ G06F 8/61
358/1.15
2011/0066862 A1* 3/2011 Sugimoto .......... H04N 1/00347
713/189

FOREIGN PATENT DOCUMENTS

| EP | 0949806 | 10/1999 |
|---|---|---|
| JP | 2011-019144 | 1/2011 |
| JP | 2013-077942 | 4/2013 |

OTHER PUBLICATIONS

Extended European Search Report, Sep. 27, 2016, European Patent Application No. 16163508.1 (8 pages).

* cited by examiner

*Primary Examiner* — Douglas Tran
(74) *Attorney, Agent, or Firm* — Hamre, Schumann, Mueller & Larson, P.C.

(57) ABSTRACT

A printer includes an authenticator that authenticates a login of a user, a prohibited job memory that stores a prohibition information list, a prohibition list register that loads job information on a print job from a storage medium installed in the printer and stores the job information in the prohibited job memory as the prohibition information list in [1] a case where a preset time has elapsed from the user's last operation or [2] a case where the storage medium is still installed in the printer at a user's logoff request, and a controller. In loading a print job from a storage medium installed in the printer, the controller prohibits a print process of the print job loaded from the storage medium when job information of the print job loaded from the storage medium corresponds with the job information contained in the prohibition information list.

3 Claims, 4 Drawing Sheets

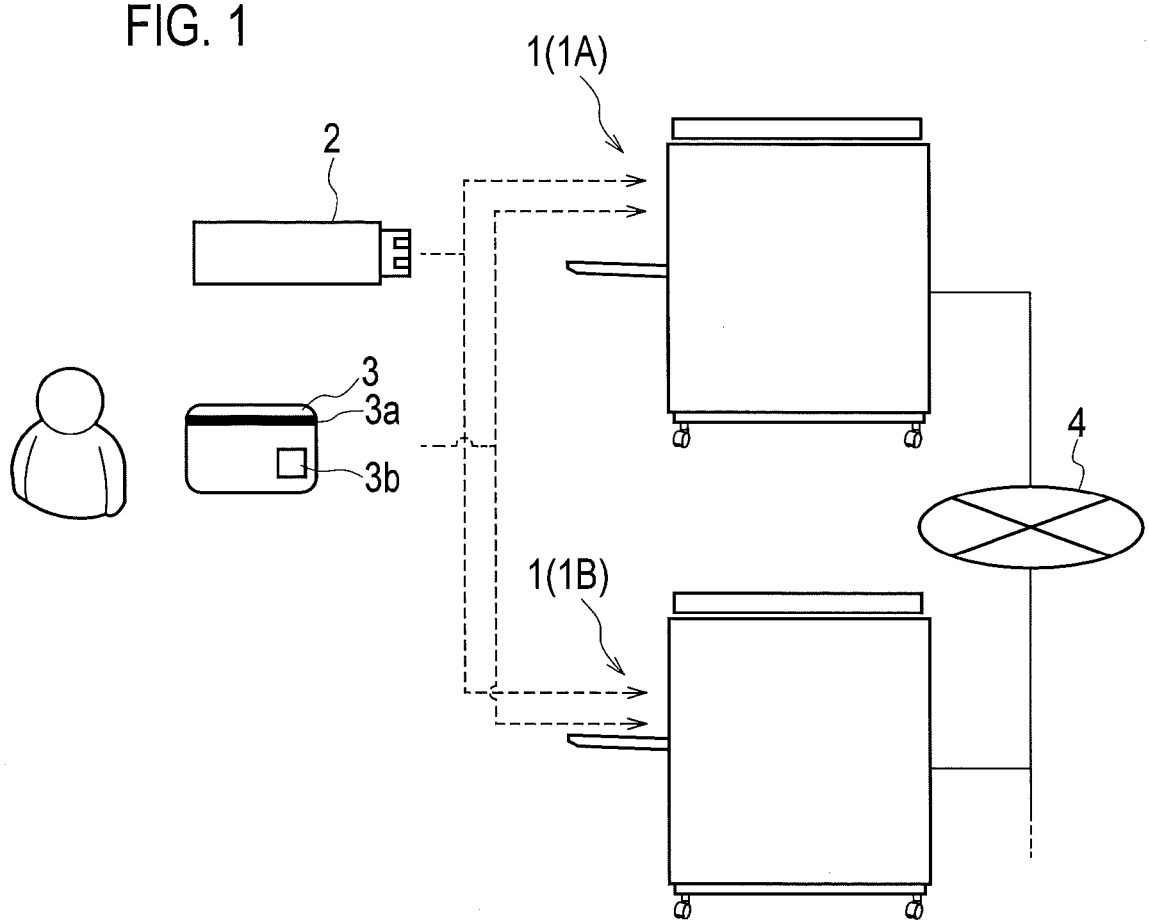

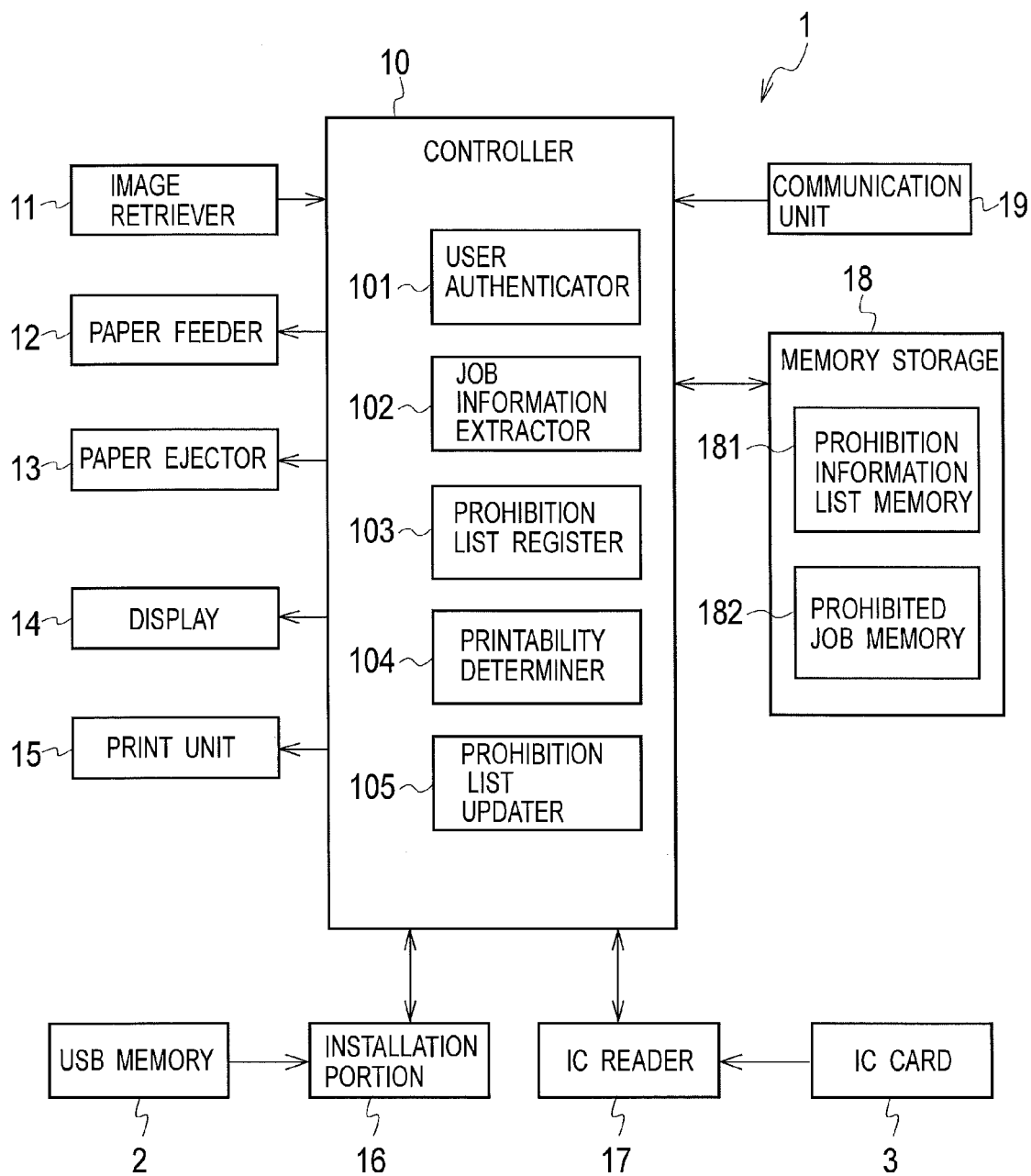

PRINTER

BACKGROUND OF THE INVENTION

Technical Field

The present invention relates to a printer that improves security.

Background Arts

Now, with respect to an image forming apparatus such as a printer, a copier and an all-in one machine, an apparatus provided with multiple functions in order to enhance its additional values becomes highly-popularized. In addition, a printer provided with a function that enables of transferring various data with a removal storage medium such as a USB (Universal Serial Bus) memory and a SD (Secure Digital) card is developed recently. In such a printer, it is possible to print out electric files (such as image files or document files stored in a storage medium), and to store image files (such as original images scanned by a scanner of the printer) in a storage medium.

In such a printer, there may be a case where a user forgets to remove a storage medium that was installed in the printer by the user after his/her operation is completed. Especially in a case where a long-time operation is done from the installation of the storage medium, the user becomes increasingly likely to forget to remove the storage medium. In such a case, the storage medium still installed in the printer may be obtained by a third person other than the user, so that various print data stored in the storage medium may leak.

A Patent Document 1 (Japanese Patent Application Publication No. 2013-77942) discloses one of solutions to the above problem. In the disclosure, when a preset time has elapsed from a login time, print data stored in a storage medium installed in an installation port of a printer are moved to a storage memory of the printer and then the print data are deleted from the storage medium. Therefore, leakage of the print data stored in the storage medium, which is caused by failing to remove the storage medium, can be prevented.

SUMMARY OF THE INVENTION

However, according to the disclosure of the Patent Document 1, since print data are stored in a printer that is used by plural users, information leakage to a third person who has an access authority to the printer cannot be prevented.

An object of the present invention is to provide a printer that can prevent information leakage by not storing print data in the printer in order to improve security.

An aspect of the present invention provides a printer that executes a print process based on a print job, comprising: an installation portion to which a storage medium storing a print job is detachably installed; an authenticator that authenticates a login of a user who has authority for accessing the storage medium and executing a print process of the print job; a prohibited job memory that stores a prohibition information list; a prohibition list register that loads job information on the print job from a storage medium and stores the job information in the prohibited job memory as the prohibition information list in [1] a case where a preset time has elapsed from a last operation by the user or [2] a case where the storage medium is still installed in the installation portion at a logoff request by the user; and a controller that, in loading a print job from a storage medium installed in the installation portion, prohibits a print process of the print job loaded from the storage medium when job information of the print job loaded from the storage medium corresponds with the job information contained in the prohibition information list.

Here, the meaning of "in loading a print job from a storage medium installed" includes a case where a print job is loaded when a storage medium is newly installed in the installation portion, and a case where a print job is reloaded again at a reboot after a shutdown of the printer caused by power discontinuity under a condition where a storage medium is still installed in the installation portion.

According to the aspect, in the above case [1] or [2], job information is loaded from a storage medium installed in the installation portion, and the job information is stored in the prohibition job memory as the prohibition information list. Then, at a new installation of a storage medium in the installation portion, the controller prohibits a print process of print data stored in the newly-installed storage medium when the job information contained in the prohibition information list and job information loaded from the newly-installed storage medium correspond with each other.

In the case [1] or [2], job information on a print job(s) stored in a print medium is stored in the prohibition job memory, and a print process of a print job(s) having the same content as the job information stored in the prohibition job memory is prohibited. Therefore, even when the storage medium is forgotten to be removed from the installation portion, job data stored in the storage medium can be prevented from leaking from the storage medium. In addition, since only job information is stored in the printer but job data are not stored in the printer, the job data never stolen from the printer. Further, a data volume stored in the printer can be reduced, and thereby speed-up of arithmetic processings and cost-reduction of a storage(s)/memory(-es) in the printer can be also brought.

It is preferable that the prohibition list register stores the job information loaded from the storage medium while associating the job information with user information of the user, the printer further comprises a prohibition list updater that, in loading a print job from a storage medium installed in the installation portion, when job information of the print job loaded from the storage medium corresponds with the job information contained in the prohibition information list and a user that is being authenticated by the authenticator corresponds with a user who is associated with the user information contained in the prohibition information list, updates the prohibition information list by removing said job information from the prohibition information list.

According to this, since the prohibition list updater updates the prohibition information list, it can be prevented that a print process is unnecessarily prohibited when a valid user tries to reprint his/her own print data. On the other hand, it can be prevented that a print process is executed by a malicious user who steals a storage medium. Here, the update is executed base on correspondences with respect to both of a user(s) and job information. Therefore, in a case where plural print jobs are registered in the prohibition information list and a valid user having a print authority of the plural print jobs stores only one of the plural print jobs in his/her own storage medium, prohibition for the other print jobs is not lifted/deactivated and thereby leakage of the other print jobs can be avoided.

It is preferable that the printer further comprises a communication unit that is connected with an external device and enables of sharing the prohibition information list with the external devices.

It can be prevented that a third person who stole a print medium left in the printer executes a print process by using the external device. Therefore, information stored in the left storage medium can be prevented from leaking.

BRIEF DESCRIPTION OF THE DRAWINGS

FIG. 1 is a configuration diagram including a printer according to an embodiment;

FIG. 2 shows a data configuration of print data stored in a storage medium;

FIG. 3 is a block diagram of the printer;

DESCRIPTION OF THE EMBODIMENT

Figure 4:
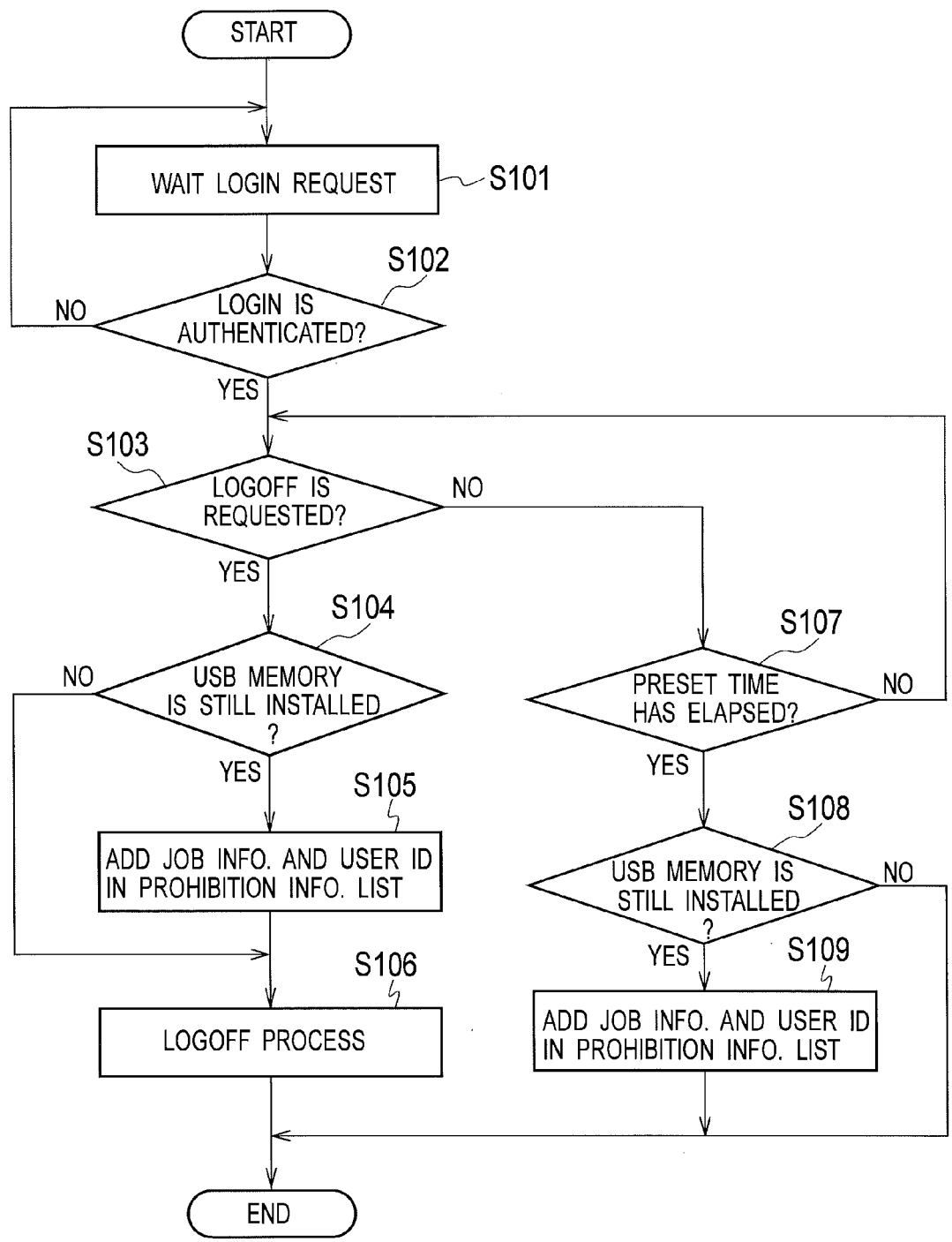
FIG. 4 is a flowchart of a prohibition information list registration process.

Hereinafter, a printer according to an embodiment will be described with reference to the drawings.
(Overall Configuration of Printer)

Note that types and the number of devices connected to a communication network 4 are not limited to those in the present embodiment shown in FIG. 1.

As shown in FIG. 1, plural printers 1 (1A, 1B, . . . ) according to the present embodiment are connected with each other via the communication network 4. A user executes a login authentication to the communication network 4 by using an IC card 3 that certificates a user's identification, and then executes a print process of print data stored in a USB memory 2 by using the printer(s) 1.

Each of the printers 1 (hereinafter, referred as the "printer 1" merely) is a network printer for executing a print process of print data according to a print command based on a user's operation. The printer 1 is provided with a connection port or slot as an installation portion 16 to which a portable storage medium (the USB memory 2, a memory card or the like) is detachably installed. The printer 1 has a function for printing job data stored in the storage medium (USB memory 2) installed in the installation portion 16.

The communication network 4 is a distributed-type IP network that is constructed by connecting various communication lines (an optical line such as FTTH, a public line such as ADSL, a private line, a wireless communication network) by using a communication protocol TCP/IP. The IP network also contains a LAN (local area network) such as a Wi-Fi network, an intranet (intra-firm network) using 100BASE-TX, a home network and so on.

The IC card 3 is distributed to each user, and stores a user ID that certificates the user. The IC card 3 has a function for sending its certification/identification data to a user authenticator 101 in the printer 1 by contactless communication. In the present embodiment, the IC card 3 is a card-type storage medium such as a company ID card, and has a magnetic stripe 3a and an IC chip 3b as shown in FIG. 1, for example. The user ID is stored in the magnetic stripe 3a and/or the IC chip 3b. In addition, the user ID works as authentication information required for lifting/deactivating an after-explained print prohibition(s).

The USB memory 2 can be installed-in and removed-from the printer 1, and is a storage medium portable by a user. The USB memory 2 stores print data. Note that, as shown in FIG. 2, the print data is composed of image data made by various application software solutions, and job information that contains information on the print data. The job information contains meta-information other than the image data that is a main block (e.g. a text block of a document), such as a job name, a job generation date and the number of pages.

Although a job name, a job generation date and the number of pages are contained as the job information in the present embodiment, the job information is not limited to this. For example, at least one or more of a job name, a job generation date and the number of pages may be contained as the job information, and information on other than those may be contained in the job information.

Although it is not shown in the drawings in the present embodiment, a client terminal(s) that is operated by a user(s) is connected to the communication network 4. Note that the client terminal is an arithmetic processing unit provided with a CPU, and has a function for generating image data to be used in printing with various software solutions and commanding execution of a print process of the image data. The client terminal is a general-purpose computer such as a personal computer or a special device whose function is specialized, for example. The client terminal may be a smartphone, a mobile computer, a PDA (Personal Digital Assistance) or a mobile phone.
(Functional Configuration of Printer)

Next, functional configuration of the printer 1 according to the present embodiment will be described. Note that a "module" to be used in the present embodiment is configured by a hardware solution such as a device and an instrument, a software solution having an equivalent function to that of the hardware, or combination of them, and indicates a functional unit for achieving a desired operation.

As shown in FIG. 3, the printer 1 according to the present embodiment includes a controller 10, an image retriever 11, a paper feeder 12, a paper ejector 13, a display 14, a print unit 15, an installation portion 16, an IC reader 17, and a memory storage 18.

The image retriever 11 is a mechanism, such as a scanner, that retrieves a document optically by using a lens(es), a CCD(s) and so on, and then outputs it as an electric signal(s). This retrieved information is processed/edited based on a given command(s) (scale enlargement/reduction and so on), and then output to the controller 10.

During a print process, the paper feeder 12 supplies print papers stacked on a paper feed tray sheet by sheet by using paper feed rollers, a pair of registration rollers and so on. The paper ejector 13 has an ejected-paper selector, a pair of paper ejection rollers and a paper ejection tray. The paper ejector 13 transfers a printed paper(s) to the ejection paper tray or to a turn-over path for duplicate printing by controlling its elements mentioned above according to commands from the controller 10.

The print unit 15 records images on a print paper(s) based on digital image signals retrieved by the image retriever 11. The print unit 15 records images on a print paper(s) by ejecting ink droplets onto the print paper from its inkjet heads based on processed digital image signals from the controller 10.

The print unit 15 is provided with plural inkjet heads. The plural inkjet heads form four head rows for black (K), cyan (C), magenta (M) and yellow (Y) in this order. In addition, on each of the inkjet heads, plural nozzles are aligned in a direction perpendicular to a paper transfer direction.

The display 14 displays operational information on a print process executed in the printer 1 and so on, and has a function for displaying and receiving user's operations. The display 14 is provided with a touch screen, and sends operational commands to the controller 10 for various processes based on touching operations thereon, such as a setting process for print settings or a start process of a print execution.

The IC reader 17 is a reader/writer device for reading out a user ID stored in the IC card 3. As the IC reader 17, a contactless-type reader/writer device that sends a weak signal to an antenna installed in the IC card 3 and then read out data by receiving a user ID stored in the IC card 3 can be used. Note that the IC reader 17 is not limited to a contactless-type reader/writer device, but may be a mechanical type device by which a card having the IC chip 3b or a magnetic card to be inserted into a slot. Namely, a reader compatible with one or more media that store a user ID can be used as the IC reader 17.

The installation portion 16 is a USB port to which the USB memory 2 is installed, and transfers print data stored in the USB memory 2 to the printer 1. Note that the installation portion 16 in the present embodiment is configured of a USB (female) connector, but may be configured of one of various installation devices compatible with a storage medium storing print data.

The communication unit 19 is a communication interface such as a network card. The printer 1 (1A) is connected with the communication network 4 via the communication unit 19, and thereby can be synchronized with another printer(s) 1 (1B) on the communication network 4. The printer 1 can receive print data and control programs from the client terminal(s) via the communication unit 19. Especially in the present embodiment, the communication unit 19 is connected with external devices (e.g. the other printer(s) 1B) via the communication network 4, and has a function for sharing an after-explained prohibition information list with the external devices.

The memory storage 18 is a memory device that stores various data, programs and so on. The memory storage 18 temporarily stores print data loaded from the USB memory 2. Especially in the present embodiment, the memory storage 18 is provided with a prohibition job memory 182 and a prohibition information list memory 181.

The prohibition job memory 182 is a memory device that stores job information on a print job(s) that is prohibited to be printed. The prohibition job memory 182 stores job information that is information on job data stored in the USB memory 2 while associating the job information with a user ID that is authenticated at a login by a user authenticator 101, a job ID and so on. In the present embodiment, the prohibition job memory 182 associates job information with a user ID, and stores the job information associated with the user ID. Note that the prohibition job memory 182 extracts job information of all print data contained in the USB memory 2 at a timing when the USB memory 2 is installed to the installation portion 16. Since the job information extracted from the USB memory 2 is to be registered in the prohibition information list, the job information is stored temporarily in the prohibition job memory 182 until a list registration process.

The prohibition information list memory 181 is a memory device for storing a data list retaining information on print data that are prohibited to be printed by the controller 10. The prohibition information list memory 181 stores and retains the job information stored in the prohibition job memory 182 as a prohibition information list. In the prohibition information list, the job information of the job data (print data) in the USB memory 2 and a user ID of a user who is an owner of the USB memory 2 are stored and retained while being associated with each other. Note that the prohibition information list can be synchronized with the other printer(s) 1 by the communication unit 19 via the communication network 4.

The controller 10 is an arithmetic processing unit that is composed of a processor(s) such as a CPU and a DSP (Digital Signal Processor), a memory(-ies) such as a ROM, a RAM and an HDD, other hardware solutions such as electronic circuitry(-ies), software solutions that have equivalent functions to them such as programs, or combination of these solutions. The controller 10 arbitrarily loads programs and executes the programs to construct various functional modules virtually, and then performs processes of image data by controlling the components such as the print unit 15, the paper feeder 12 and the paper ejector 13, and various processes for controlling the components and processing user's operations. Especially in the present embodiment, the controller 10 is provided with a functional module for preventing an information leakage by prohibiting a print process(es) of print data. Specifically, the controller 10 is provided with a user authenticator 101, a job information extractor 102, a prohibition list register 103, a printability determiner 104, and a prohibition list updater 105.

The user authenticator 101 is a module that authenticates a login of a user who has an authority for accessing the USB memory 2 and executing a print process. In the present embodiment, the user authenticator 101 verifies a user ID read by the IC reader 17 at the login with authentication information stored therein, and performs a login authentication process based on consistency between them. Note that the login authentication process by the user authenticator 101 may be done with a password by prompting an input of a password on the display 14. When a valid access authentication can be confirmed, the user authenticator 101 outputs a signal that allows operability of the components of the printer 1. On the other hand, when a valid access authentication cannot be confirmed, the user authenticator 101 displays an error or a warning on the display, and rejects operations.

The job information extractor 102 is a module that extracts the job information form the USB memory 2 installed in the installation portion 16. The job information extractor 102 extracts the job information, and stores the job information in the prohibition job memory 182 while associating the job information with user information (e.g. a user ID) of a user whose login is authenticated by the user authenticator 101. This process for storing the job information in the prohibition job memory 182 can be executed when a USB memory 2 is installed or after a login authentication process, and is executed, at the latest, by the time when a preset time has elapsed from a user's predetermined operation or by the time when a logoff request that discontinues the access authority is input. In the present embodiment, the job information extractor 102 extracts only job information in print data just after receiving, from the installation portion 16, a signal that indicates an installation of a USB memory 2, and then stores the job information in the prohibition job memory 182 while associating the job information with a user ID of a user authenticated by the user authenticator 101.

The prohibition list register 103 is a module that registers job information of a print job(s) whose print process(es) is prohibited in the prohibition information list memory 181, from the job information stored in the prohibition job memory 182. In the present embodiment, the prohibition list register 103 registers the job information (that is stored in the prohibition job memory 182 or in the installed USB memory 2) in the prohibition information list memory 181 in [1] a case where a preset time has elapsed from the final operation by a user who are logging in or [2] a case where a logoff request is input. Note that the preset time from the last operation is preliminarily set and stored in the memory storage 18.

The printability determiner 104 is a module that prohibits (determines prohibitions of) a print process of a job(s) whose job information corresponds with the job information contained in the prohibition information list, in loading a print job(s) from a USB memory 2 installed in the installation portion 16. The meaning of "in loading a job(s) from a USB memory 2 installed" includes a case where a print job(s) is loaded when a USB memory 2 is newly installed in the installation portion 16, a case where a print job(s) is reloaded again at a reboot after a shutdown of the printer 1 caused by power discontinuity under a condition where a USB memory 2 is still installed in the installation portion 16, and so on.

This prohibition process of a print process will be described in detail hereinafter. Specifically, the printability determiner 104 sequentially determines (judges) whether or not the job information of all print data loaded from the USB memory 2 corresponds with the job information contained in the prohibition information list memory 181. Here, when no job information that corresponds with the loaded job information is contained in the prohibition information list memory 181, it is determined (judged) that the print data of the loaded job information are printable (allowed to be printed). On the other hand, when job information that corresponds with the loaded job information is contained in the prohibition information list memory 181, it is further determined (judged) whether or not a user ID of a user who is currently logging-in corresponds with a user ID that is associated with the job information stored in the prohibition information list memory 181. Here, when the user IDs correspond with each other, it is regarded as a printing operation by a user having a valid access authority, and thereby it is determined (judged) that the print data of the job information associated with the corresponding user ID are printable (allowed to be printed). On the other hand, when the user IDs don't correspond with each other, it is regarded as a printing operation by one who gets the print data fraudulently, and thereby it is determined (judged) that the print data of the job information associated with the user ID that doesn't correspond-with are not printable (prohibited to be printed).

The prohibition list updater 105 is a module that updates the prohibition information list by deleting the job information stored in the prohibition information list memory 181 from the prohibition information list. In the present embodiment, the job information that has been determined as printable is automatically deleted from the prohibition information list by the prohibition list updater 105. Namely, when the job information in the prohibition information list and the job information in the USB memory 2 correspond with each other, the prohibition list updater 105 deletes the job information from the prohibition information list to make a print job of the job information printable (allowed to be printed).

In the present embodiment, the job information is automatically deleted by the prohibition list updater 105 according to the determination result of the printability determiner 104. However, the job information may be deleted by the prohibition list updater 105 according to a user's manual operation. In addition, the job information may be deleted by the prohibition list updater 105 according to a manual operation made by an administrator who has administrative privileges. In these cases, the prohibition information list is displayed on the display 14 to receive a user's operation.

Further, an expiration limit (date/time) may be set to job information that has been retained in the prohibition information list memory 181, and thereby the job information will be deleted automatically when the job information expires on/at the expiration limit (date/time).

Note that the controller 10 has a function for synchronizing the prohibition information list with the other printer(s) 1 via the communication network 4. Therefore, the controller 10 can share the prohibition information list with the other printer(s) 1 connected to the communication network 4, and thereby can prevent leaked print data from being printed by the other printer(s) 1.

(Operations of Printer)

Figure 5:
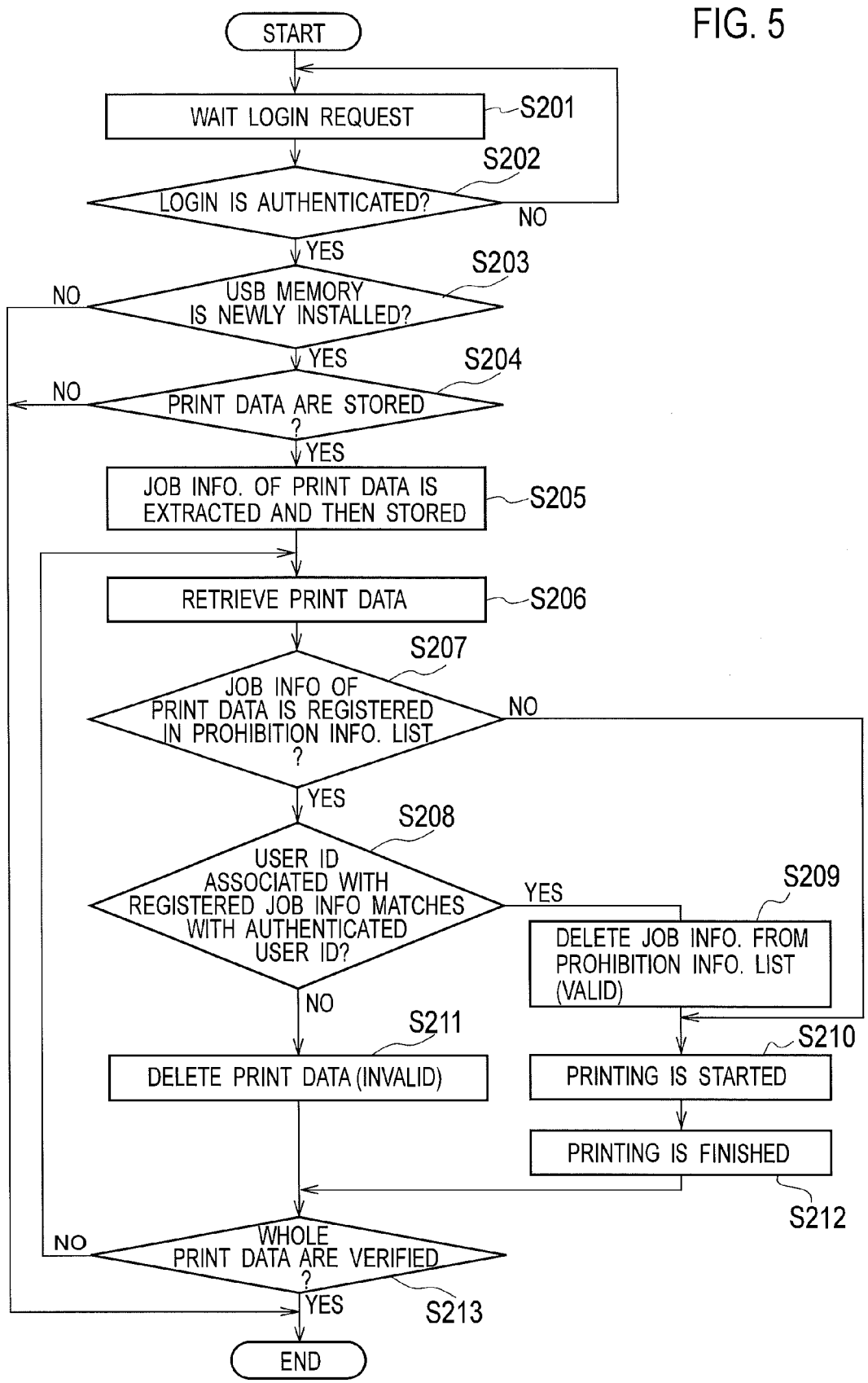
FIG. 5 is a flowchart of a printability determination process.

Next, operations of the printer 1 according to the present embodiment will be described. The printer according to the present embodiment mainly executes a prohibition information list registration process (FIG. 4) and a printability determination process (FIG. 5). Therefore, these processes will be described in detail hereinafter.

<Prohibition Information List Registration Process>

The prohibition information list registration process is executed in order to collect base information for prohibiting a print process (creation of the prohibition information list). As shown in FIG. 4, the controller 10 waits a login request by a user (step S101). When a login is requested, a login authentication process is done (step S102). Specifically, the user authenticator 101 reads out a user ID from an IC card 3 by the IC reader 17, and then determines (judges) whether or not the user ID corresponds with a user ID stored in the memory storage 18. Note that the user authenticator 101 may prompt the user to input his/her password.

When the authentication is denied by the user authenticator 101 (NO in step S102), an error or a warning is displayed, and then the controller 10 waits a login request again. On the other hand, the authentication is approved by the user authenticator 101 (YES in step S102), processes such as a print process and a copy process are made executable.

While the user is being logged in, the controller 10 monitors whether or not a logoff request is input by the user (step S103). When a logoff is requested (YES in step S103), it is determined whether or not a USB memory 2 is still installed in the installation portion 16 at the time when the logoff is requested (step S104). When no USB memory 2 is installed in the installation portion 16 (NO in step S104), a logoff process is executed (step S106).

On the other hand, when a USB memory 2 is still installed in the installation portion 16 (YES in step S104: a situation where the USB memory 2 may be left out after the logoff and then information leakage from the USB memory 2 may easily occur), its status is sent to the prohibition list register 103. The prohibition list register 103 extracts job information of print data from the USB memory 2 (or the prohibition job memory 182 [as described above, the job information is preliminarily stored in the prohibition job memory 182 by the job information extractor 102 while being associated with the user ID]) when it receives the status. Then, the prohibition list register 103 associates the job information with the user ID, and then adds the job information associated with the user ID to the prohibition information list in the prohibition information list memory 181 (step S105).

Returning to the step S103, when a logoff is not requested (NO in step S103), it is further determined whether or not the preset time has elapsed from a process caused by the final user's operation after the login authentication (step S107). When the preset time has not yet elapsed (NO in step S107), the prohibition list register 103 waits [i.e. the process flow is looped] until a logoff is requested (YES step S103) or until the preset time has elapsed (YES in step S107). The case where a logoff is requested (YES step S103) is already described above. When the preset time has elapsed (YES in step S107), it is further determined whether or not a USB memory 2 is still installed in the installation portion 16 at the time when the preset time has elapsed (step S108).

When the USB memory 2 is not installed in the installation portion 16 (NO in step S108), the prohibition information list registration process is finished without registering the job information in the prohibition information list [step S109 is skipped].

On the other hand, when the USB memory 2 is still installed in the installation portion 16 (YES in step S108: a situation where the USB memory 2 may be left out for a long time and then information leakage from the USB memory 2 may easily occur), the prohibition list register 103 extracts job information of print data from the USB memory 2 (or the prohibition job memory 182 [as described above, the job information is preliminarily stored in the prohibition job memory 182 by the job information extractor 102 while being associated with the user ID]). Then, the prohibition list register 103 associates the job information with the user ID, and then adds the job information associated with the user ID to the prohibition information list in the prohibition information list memory 181 (step S109).

<Printability Determination Process>

The printability determination process is executed in order to judge printability (printable, or prohibit to print) based on the prohibition information list. As shown in FIG. 5, the controller 10 of the printer 1 waits a login request by a user (step S201). When a login is requested, a login authentication process is done (step S202). Specifically, the user authenticator 101 reads out a user ID from an IC card 3 by the IC reader 17, and then determines (judges) whether or not the user ID corresponds with a user ID stored in the memory storage 18. Note that the user authenticator 101 may prompt the user to input his/her password.

When the authentication is denied by the user authenticator 101 (NO in step S202), the controller 10 waits a login request again. On the other hand, the authentication is approved by the user authenticator 101 (YES in step S202), it is determined whether or not a USB memory 2 is newly installed in the installation portion 16 (step S203). When no USB memory 2 is installed in the installation portion 16 (NO in step S203), the printability determination process is finished, and then the process flow is returned to a normal print mode.

On the other hand, when a USB memory 2 is newly installed in the installation portion 16 (YES in step S203), it is further determined whether or not the USB memory 2 stores print data (step S204). When the USB memory 2 doesn't store print data (NO in step S204), the printability determination process is finished, and then the process flow is returned to a normal print mode. On the other hand, when the USB memory 2 stores print data (YES in step S204), the job information extractor 102 extracts job information from the print data, and then temporarily stores the job information in the prohibition job memory 182 (step S205).

When a print request is input to the printer 1 by the user after the step S205, the controller 10 sequentially loads (data sets in) the print data stored in the USB memory 2 (step S206). Then, the job information extractor 102 extracts job information included in the print data, and the printability determiner 104 determines whether or not the prohibition information list memory 181 stores job information that corresponds with the extracted job information (step S207).

When there is no corresponding job information in the prohibition information list memory 181 (NO in step S207), a print process is started (step S210) and then finished (step S212). On the other hand, the prohibition information list memory 181 stores corresponding job information (YES in step S207), the prohibition list updater 105 determines whether or not a user ID associated with the corresponding job information corresponds with the user ID that is being authenticated [i.e. with the user ID of the user who is currently logging in] (step S208).

When the user IDs don't correspond with each other (NO in step S208), the print data of the corresponding job information might be leaked due to information leakage, and thereby its print is prohibited, in addition, the loaded print data that were possibly leaked are deleted (step S211). On the other hand, when the user IDs corresponding with each other (YES in step S208), the prohibition list updater 105 determines that the user of the authenticated user ID [i.e. the user who is currently logging in] got the print data validly, and thereby deletes the corresponding job information from the prohibition information list memory 181 (step S209). Subsequently, a print process is started (step S210) and then finished (step S212).

When a printability determination for one data set of print data is finished, the controller 10 determines whether or not all printability determinations for whole print data are completed (step S213). When they are not yet completed (NO in step S213), a next data set is loaded, and then the processes of steps S206 to S212 are repeated for the next data set. On the other hand, when all printability determinations for whole print data are completed (YES in step S213), the printability determination process is finished.

As described above, according to the present embodiment, when or while a USB memory 2 is installed in the printer 1, the job information extractor 102 extracts job information from the USB memory 2 installed in the installation portion 16 in [1] a case where the preset time has elapsed from the user's last operation after the login authentication by the user authenticator 101 or [2] a case where a logoff request is input by the user whose login is authenticated, and then stores the extracted job information in the memory storage 18 as a prohibition information list. Then, when the job information stored in the memory storage 18 and job information loaded from a USB memory 2 installed in the installation portion 16 correspond with each other, a print process thereof is prohibited.

Therefore, since the job information with respect to print jobs stored in the USB memory 2 is installed in the memory storage 18 in the above case [1] or [2] and then a print job(s) having the same content as the job information stored in the memory storage 18 is prohibited from being printed, information leakage of job data stored in an installed USB memory 2 can be prevented even when the USB memory is left forgotten to be removed from the installation portion 16.

In addition, according to the present embodiment, since only job information is stored in the printer 1 but image data is not stored in the printer 1, image data can be prevented from leaking from the printer 1, or from being stolen from the printer 1. Further, a data volume stored in the printer 1 can be reduced, and thereby speed-up of arithmetic processings and cost-reduction of memory unit(s)/device(s) in the printer (such as the memory storage 18 and a RAM and an HDD in the controller 10) can be also brought.

In addition, according to the present embodiment, when a USB memory 2 is newly installed in the installation portion 16, the job information extractor 102 extracts job information of all data sets of print data stored in the newly-installed USB memory 2, and the printability determiner 104 determines, with respect to each of the data sets, whether or not the job information extracted from the newly-installed USB memory 2 corresponds with the job information contained in the prohibition information list preliminarily generated in the printer 1. When they correspond with each other, a print process for a print job of the corresponding data set of the print data is prohibited. Therefore, it is possible to determine whether or not a print process must be prohibited for all print jobs stored in the newly-installed USB memory 2.

According to the present embodiment, job information is automatically in a case where [1] a user whose login is authenticated and a user associated with the job information recorded in the prohibition information list correspond with each other and [2] the job information in the prohibition information list stored in the memory storage 18 and the job information loaded from a USB memory 2 newly installed in the installation portion 16 correspond with each other. Therefore, it can be prevented that a print process is unnecessarily prohibited when a valid user tries to reprint his/her own print data. On the other hand, it can be prevented that a print process is executed by a malicious user who steals a storage medium such as the USB memory 2.

Here, job information is deleted automatically from the prohibition information list in a case wherein users correspond with other and, concurrently, job information stored in the memory storage 18 corresponds with job information loaded from a USB memory 2. Therefore, for example, in a case where plural print jobs A to C are registered in the prohibition information list and a valid user who has a print authority of the print jobs A to C stores only the print job A in his/her own storage medium (USB memory 2), prohibition for the other print jobs B and C is not lifted/deactivated and thereby leakage of the print jobs B and C can be avoided.

In addition, according to the present embodiment, job information stored in the prohibition job memory 182 is stored as the prohibition information list by in the prohibition list register 103, and a print process of a job(s) having the same content as that of the job information registered in the prohibition information list is prohibited. Therefore, by retaining the prohibition information list or sharing the prohibition information list with other devices (e.g. the other printers 1) via the communication unit 19, it is possible to prohibit a fraudulent print execution of print data without fail by determining whether or not the print data has leaked even when the fraudulent print execution of the print data is tried in the other devices.

Note that the printer 1 in the present embodiment is an inkjet printer. However, the printer of the present invention is not limited to an inkjet printer, and may be one of various-type printers, such as a thermal transfer printer, a thermal printer and a photo printer.

In addition, the IC card 3 used with the printer 1 in the present embodiment is a card-type storage medium. However, it is not limited to this, and may be one that can store identification information of a user and can be carried by the user, specifically, may be a mobile authentication device such as a mobile phone in which an IC chip is installed, for example.

The present invention is not limited to the above-mentioned embodiment and modified examples, and it is possible to embody the present invention by modifying its components in a range that does not depart from the scope thereof. Further, it is possible to form various kinds of inventions by appropriately combining a plurality of components disclosed in the above-mentioned embodiment and modified examples. For example, it may be possible to omit several components from all of the components shown in the above-mentioned embodiment.

The present application claims the benefit of a priority under 35 U.S.C. §119 to Japanese Patent Application No. 2015-95371, filed on May 8, 2015, the entire content of which is incorporated herein by reference.

What is claimed is:

1. A printer that executes a print process based on a print job, comprising:
    an installation portion to which a storage medium storing a print job is detachably installed;
    an authenticator that authenticates a login of a user who has authority for accessing the storage medium and executing a print process of the print job;
    a prohibited job memory that stores a prohibition information list;
    a prohibition list register that loads job information on the print job from a storage medium and stores the job information in the prohibited job memory as the prohibition information list in [1] a case where a preset time has elapsed from a last operation by the user or [2] a case where the storage medium is still installed in the installation portion at a logoff request by the user; and
    a controller that, in loading a print job from a storage medium installed in the installation portion, prohibits a print process of the print job loaded from the storage medium when job information of the print job loaded from the storage medium corresponds with the job information contained in the prohibition information list.

2. The printer according to claim 1, wherein
    the prohibition list register stores the job information loaded from the storage medium while associating the job information with user information of the user,
    the printer further comprises a prohibition list updater that, in loading a print job from a storage medium installed in the installation portion, when job information of the print job loaded from the storage medium corresponds with the job information contained in the prohibition information list and a user that is being authenticated by the authenticator corresponds with a user who is associated with the user information contained in the prohibition information list, updates the prohibition information list by removing said job information from the prohibition information list.

3. The printer according to claim 1, further comprising:
    a communication unit that is connected with an external device and enables of sharing the prohibition information list with the external devices.

* * * * *